US008239372B2

(12) United States Patent
Craswell et al.

(10) Patent No.: US 8,239,372 B2
(45) Date of Patent: Aug. 7, 2012

(54) USING LINK STRUCTURE FOR SUGGESTING RELATED QUERIES

(75) Inventors: Nicholas Eric Craswell, Cambridge (GB); Hugh Evan Williams, Redmond, WA (US); Ariel J. Lazier, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/890,043

(22) Filed: Sep. 24, 2010

(65) Prior Publication Data

US 2011/0016115 A1 Jan. 20, 2011

Related U.S. Application Data

(62) Division of application No. 11/761,038, filed on Jun. 11, 2007, now Pat. No. 7,822,774.

(51) Int. Cl.
*G06F 17/00* (2006.01)
(52) U.S. Cl. ........ 707/713; 707/722; 707/736; 707/758; 707/781; 707/791
(58) Field of Classification Search ........... 707/600–831
See application file for complete search history.

(56) References Cited

U.S. PATENT DOCUMENTS

| 5,832,476 | A | 11/1998 | Tada et al. |
| 6,732,088 | B1 * | 5/2004 | Glance ................................. 1/1 |
| 2004/0162833 | A1 | 8/2004 | Jones |
| 2005/0091204 | A1 * | 4/2005 | Melman ............................ 707/3 |
| 2006/0031221 | A1 | 2/2006 | Melman |

OTHER PUBLICATIONS

Non-Final Office Action in U.S. Appl. No. 12/890,086, mailed Aug. 22, 2011.
Final Office Action in U.S. Appl. No. 12/890,086, mailed Nov. 22, 2011.
Non Final Office Action of U.S. Appl. No. 12/890,086, mailed Apr. 16, 2012.

* cited by examiner

*Primary Examiner* — Isaac M Woo
(74) *Attorney, Agent, or Firm* — Shook Hardy & Bacon LLP

(57) ABSTRACT

An approach is provided for determining related queries for a given search query based on the linking structure of electronic documents within a document set. Document titles are used to represent potential search queries and links between the electronic documents are used to determine relationships between the potential search queries. As such, the document set may be represented as a directed graph in which document titles (which represent potential search queries) are nodes and links are edges between the nodes. When a particular search query is received, a corresponding node is identified and related queries are determined by identifying other nodes having connections with that node.

17 Claims, 6 Drawing Sheets

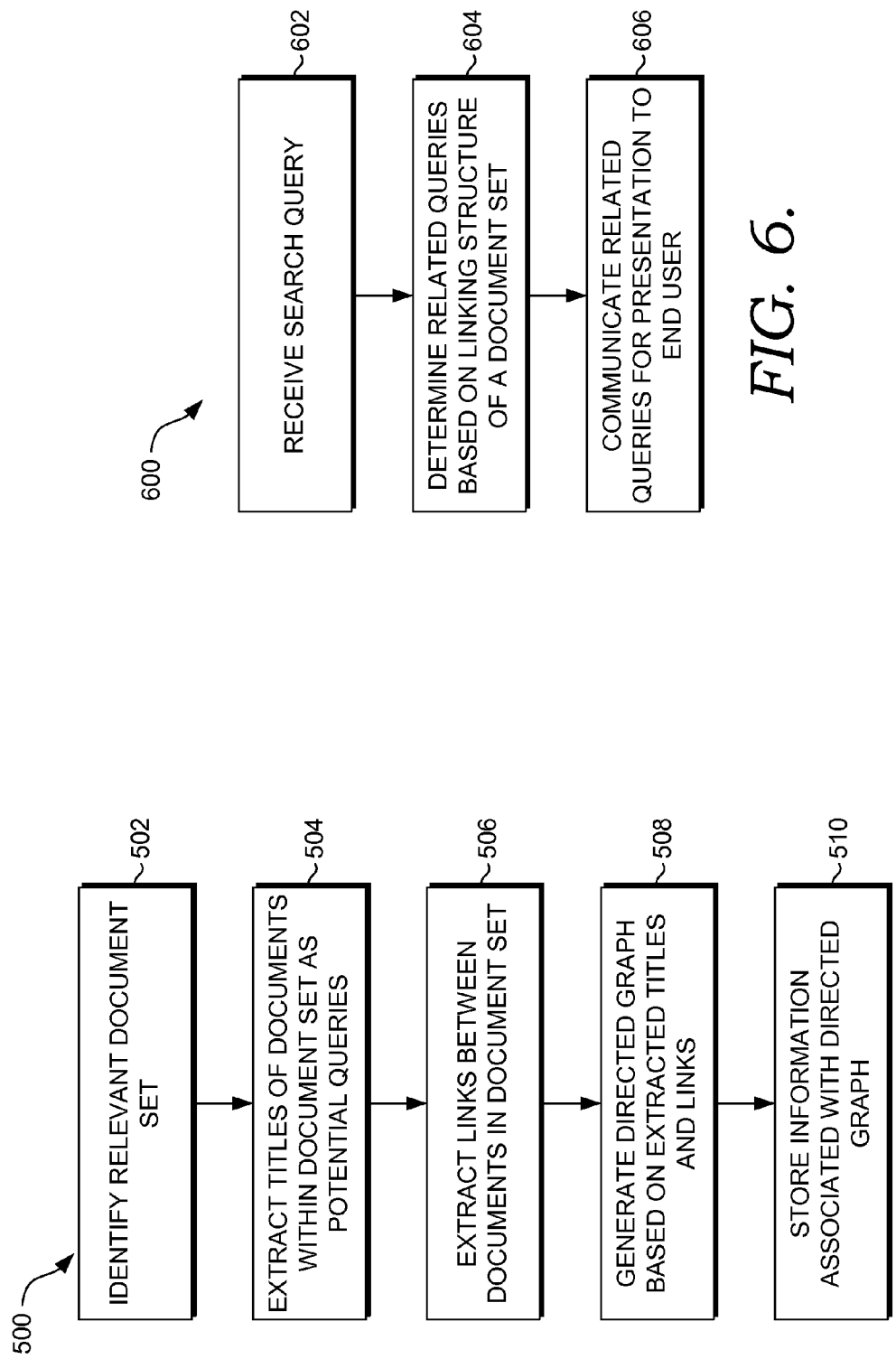

USING LINK STRUCTURE FOR SUGGESTING RELATED QUERIES

CROSS-REFERENCE TO RELATED APPLICATIONS

This application is a divisional application of U.S. patent application Ser. No. 11/761,038, filed Jun. 11, 2007, which is herein incorporated by reference in its entirety.

BACKGROUND

Many search engines provide query suggestion functionality in which a user, having entered a particular search query, is given a set of suggested queries related to the user's search query. These related queries may be helpful if the search results of the user's search query do not contain the information the user was seeking and one of the related queries will provide useful search results. The user may select one of the related queries causing a search to be performed using the selected query and search results to be returned to the user. In some cases, related queries may be useful even when users find what they were looking for by getting the users interested in other topics to explore.

A variety of different approaches and algorithms have been employed for determining related queries for a given search query. For instance, related queries may be suggested that have a short edit distance from the given search query or that contain similar words. Another approach suggests related queries based on terms occurring in the search result documents for the given search query. Further approaches suggest related queries based on the similarity of result documents between search queries.

However, a common problem for the various approaches is determining related queries that are relevant and useful. For instance, suppose that a search query is "Tom Cruise." Based on this search query, "Katie Holmes" would most likely be a relevant related query as people searching for documents associated with "Tom Cruise" are likely to be interested in information associated with "Katie Holmes." Alternatively, "Dream Cruise" would most likely be an irrelevant related query as people searching for documents associated with "Tom Cruise" are most likely not searching for information on seagoing holidays.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments relate to an approach in which related queries for a given search query are determined based on the linking structure of electronic documents within a document set. The electronic documents within the document set are scanned, and document titles and links among the electronic documents are extracted. A directed graph in which the document titles are nodes and the links are edges between the nodes is then generated.

The directed graph may be used for determining related queries for a given search query by using the document titles to represent potential search queries. When a search query is received, a first node corresponding with the search query is identified. Nodes surrounding and having connections with that first node are identified as related queries. The related queries may be provided to a user, who may employ the related queries to refine a search and obtain useful and relevant search results.

BRIEF DESCRIPTION OF THE SEVERAL VIEWS OF THE DRAWING

The present invention is described in detail below with reference to the attached drawing figures, wherein:

FIG. 5 is a flow diagram showing an exemplary method for generating a directed graph for facilitating the determination of related queries for given search queries in accordance with an embodiment of the present invention;

FIG. 6 is a flow diagram showing an exemplary method for determining suggested related queries for a given search query in accordance with an embodiment of the present invention;

DETAILED DESCRIPTION

Figure 1:
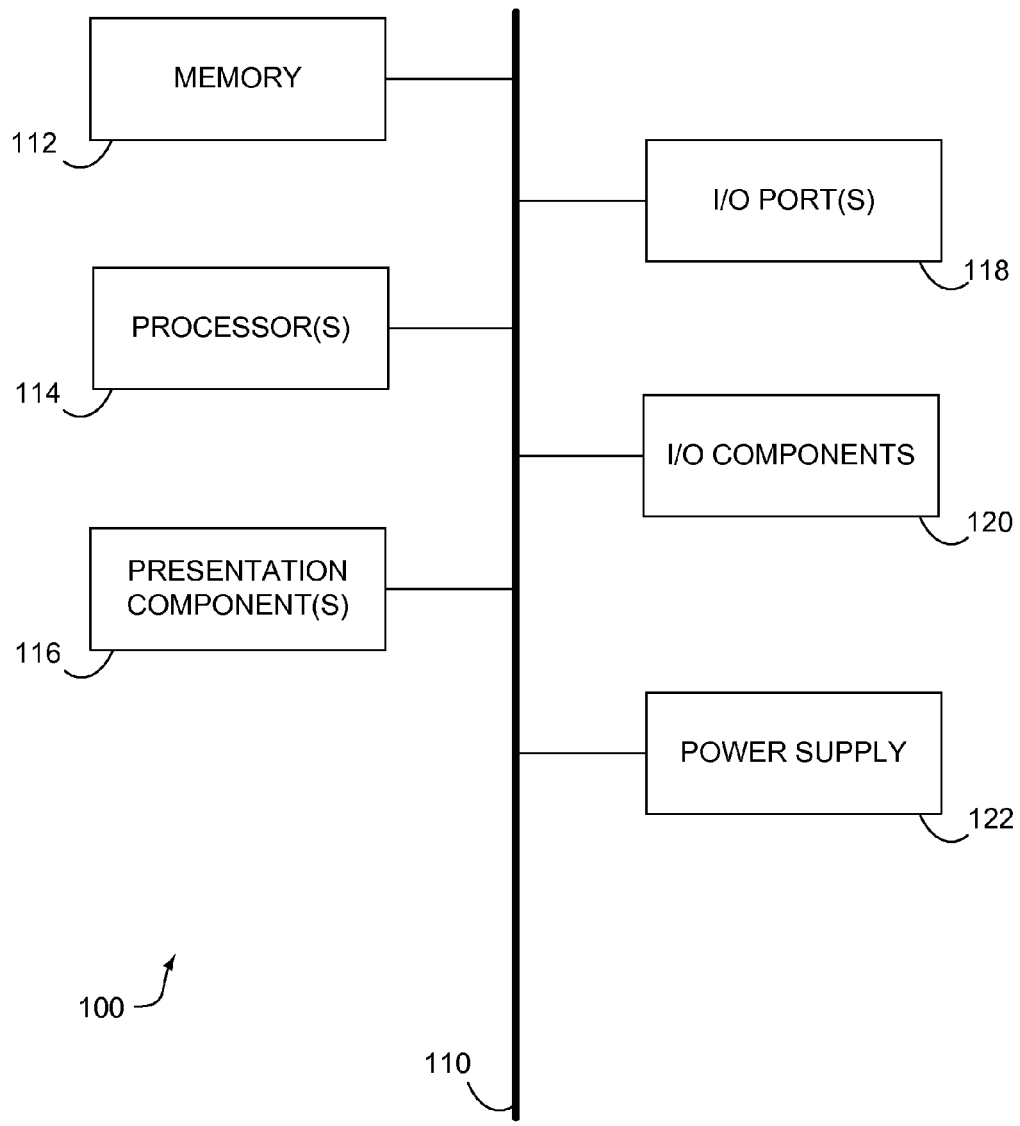
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As indicated above, embodiments of the present invention relate to an approach for providing related queries for a given search query as suggestions to refine a search and receive relevant and useful search results. Related queries for a given search query are determined based on the linking structure of electronic documents within a document set. The document set may be any grouping of electronic documents having a linking structure, and in some embodiments, is a high-quality document set from a trusted data source. To employ the linking structure of the document set to provide related queries, the title of each document is used to represent a potential search query and linking between the documents represents relationships between these potential search queries. Links between documents may be explicit, such as hyperlinks, or implicit, such as content similarity.

In an embodiment, the electronic documents within the document set are scanned, and document titles and links among the electronic documents are extracted. A directed graph in which the document titles are nodes and the links are edges between the nodes is then generated. The directed graph may be used for determining related queries for a given search query. When a search query is received, a first node corresponding with the search query is identified. Nodes surrounding and having connections with that first node are identified as related queries. The related queries may then be provided to a user, who may employ the related queries to refine a search and obtain useful and relevant search results.

Accordingly, in one aspect of the invention, an embodiment is directed to a computerized method for providing related queries for a search query. The method includes receiving the search query. The method also includes determining one or more related queries for the search query based on the linking structure of electronic documents within a document set, wherein titles of the electronic documents represent potential related queries. The method further includes communicating at least a portion of the one or more related queries for presentation to an end user.

In another embodiment of the invention, an aspect is directed to one or more computer-readable media storing computer-useable instructions that, when used by a computing device, cause the computing device to perform a method for providing related queries for a search query. The method includes receiving the search query. The method also includes determining one or more related queries for the search query based on the linking structure of electronic documents within a document set, wherein titles of the electronic documents represent potential related queries. The method further includes communicating at least a portion of the one or more related queries for presentation to an end user.

A further embodiment of the invention is directed to one or more computer-readable media storing computer-useable instructions that, when used by a computing device, cause the computing device to perform a method for providing related queries for a search query. The method includes receiving the search query. The method also includes identifying the search query as corresponding with a title of a first electronic document within a document set having a plurality of electronic documents. The method further includes determining related queries based on titles of other electronic documents within the electronic document set having a relationship with the first electronic document based on links among the plurality of electronic documents. The method still further includes communicating at least a portion of the related queries for presentation to an end user.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other storage medium that can be used to encode and store desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
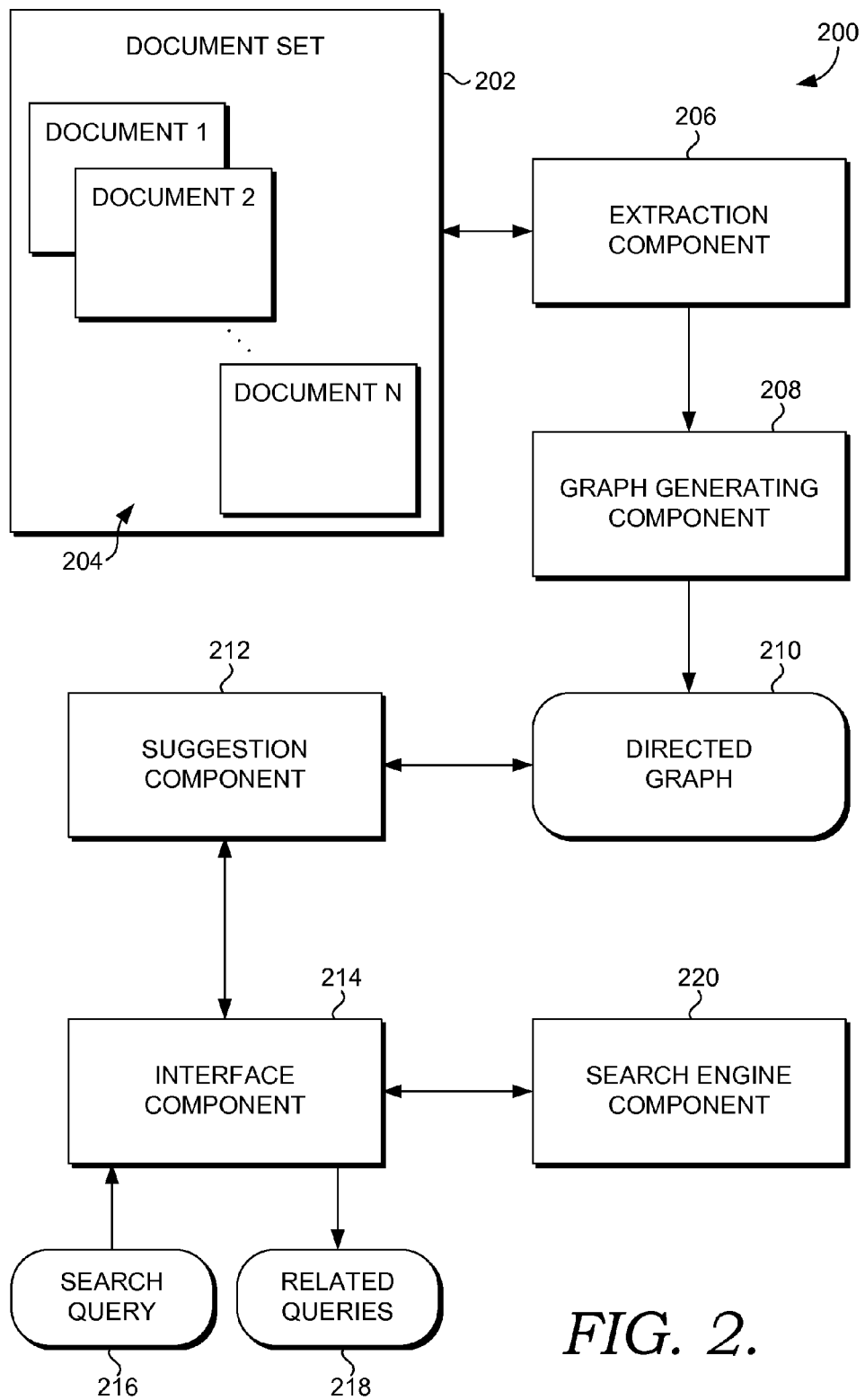
FIG. 2 is a block diagram of an exemplary system for determining suggested related queries based on linking structure within a document set in accordance with an embodiment of the present invention.

Referring now to FIG. 2, a block diagram is provided illustrating an exemplary system 200 for suggesting related queries using link structure in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 200 facilitates determining related queries for a received search query by employing a link structure contained in a document set 202. The document set 202 may generally include any set of electronic documents 204, such as web pages, for instance, having some explicit or implicit linking relationship among the documents. The document set 202 may be maintained by one or more computing devices, such as web servers, for instance, accessible by an extraction component 206. In some embodiments, the document set 202 is a high-quality set of documents from a trusted and structured data source, such as an encyclopedia, a product shopping site, a dictionary, or a highly structured website. It has been determined that by employing a high-quality document set from a trusted and structured data source, linking between documents is significantly more reliable such that highly relevant related queries may be determined for a given search query. In particular, a source that is trusted and has an enforced structure may provide high quality document titles as nodes and a generated graph that is both consistent and trustworthy. Alternatively, an untrustworthy and/or unstructured source, such as the web in general, for instance, presents the problems of a lack of consistency in how authors create pages and a lack of trust since there is no way to ensure that content authors adhere to any standards.

The extraction component 206 scans the documents 204 within the document set 202 and extracts the title of each document. For instance, in the case that the document set is an electronic encyclopedia, each document or page within the encyclopedia document set may contain information on a given subject and include a title for that subject. Accordingly, the extraction component 206 scans the encyclopedia documents and extracts the title of each subject document within the encyclopedia document set. The title of each page represents a potential query.

The extraction component 206 also extracts links among the documents 204 within the document set 202. In particular, the extraction component 206 scans the content of each document to identify links. In various embodiments, the links may be explicit links between documents and/or may be implicit linking relationships between documents. Explicit links among documents may include hyperlinks. For instance, an explicit link between two documents may be determined by identifying a hyperlink to one document that is included in the content of another document, expressly indicating a relationship between the two documents. Implicit links among documents 204 in the document set 202 may be inferred based on document content other than actual hyperlinks between documents. For instance, a link between two documents may be inferred based on the similarity of language or other attributes of the content of the two documents.

Figure 3:
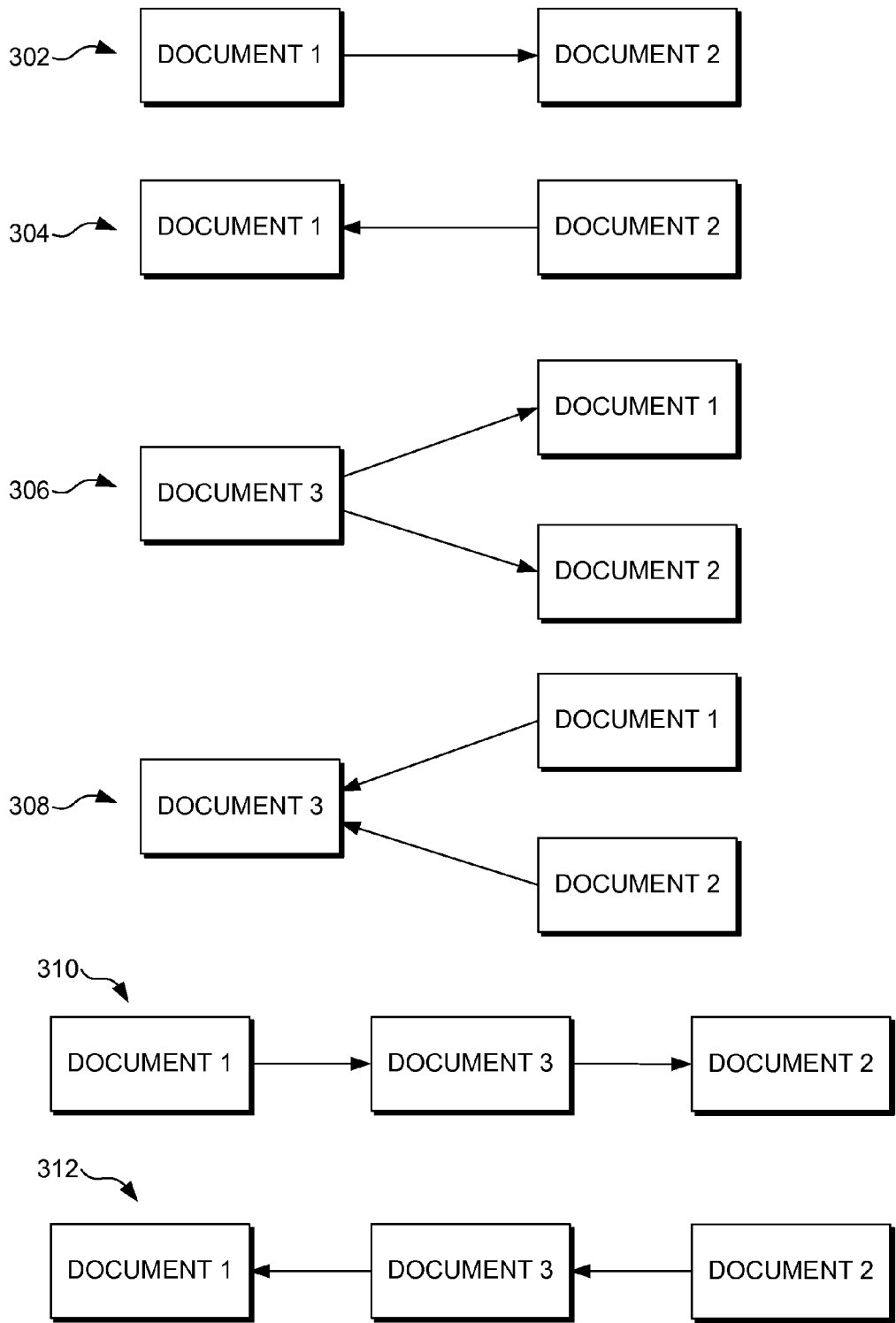
FIG. 3 illustrates exemplary linking relationships between documents in a document set.

A variety of direct and indirect linking relationships may be extracted from the document set 202 by the extraction component 206 and used to facilitate the determination of suggested related queries for a given search query. By way of example only and not limitation, FIG. 3 graphically illustrates several direct and indirect linking relationships between a first document, Document 1, and a second document, Document 2. Direct links between Document 1 and Document 2 are shown at 302 and 304. For instance, as shown at 302, Document 1 includes a link to Document 2. At 304, Document 2 has includes a direct link to Document 1. Indirect links between Document 1 and Document 2 are illustrated at 306, 308, 310, and 312. As shown at 306, Document 3 includes links to both Document 1 and Document 2 (co-citation), indicating an indirect relationship between Document 1 and Document 2. Conversely, as shown at 308, Document 1 and Document 2 each include a link to Document 3, also indicating an indirect relationship between the two documents. As further examples, 310 and 312 also illustrate indirect linking paths between Document 1 and Document 2. At 310, Document 1 includes a link to Document 3, which in turn includes a link to Document 2, indicating an indirect relationship between Document 1 and Document 2. The converse indirect relationship is illustrated at 312. Further embodiments may employ even longer paths of indirect linking. Additionally, one skilled in the art will recognize that a variety of additional linking relationships may be identified between documents 204 with the document set 202.

A graph generating component 208 uses the extracted titles and links among the documents 204 in the document set 202 to create a directed graph 210, in which each document title (which represents a possible related query) is a node and the links are edges between the nodes. In some embodiments, a single directed graph may be generated that incorporates all types of links among documents 204 in the document set 202 as the edges between nodes. In other embodiments, multiple directed graphs may be generated from the document set 202, with each directed graph incorporating a different particular type of link as the edges between nodes.

The directed graph 210 may be employed to determine suggested related queries for given search queries. As indicated previously, related queries for a given search query may be suggested to help refine a user's search and obtain more relevant and useful search results. For instance, as shown in the system 200 of FIG. 2, an interface component 214 may be provided for receiving a search query 216. As one skilled in the art will recognize, the search query 216 may comprise one or more search terms typically entered by an end user, although search terms may be automatically provided in some embodiments. Additionally, the interface component 214 may receive the search query 216 in a number of different ways. By way of example only and not limitation, a user may employ a web browser to navigate to a search engine web page and enter the search query 216 in an input box on the web page. Additionally, a user may enter the search query 216 in an input box provided by a search engine toolbar located, for instance, within a web browser, the desktop of the user's computing device, or other location. One skilled in the art will recognize that a variety of other approaches may also be employed to allow the interface component 214 to receive the search query 216.

Based on the search query 216 received at the interface component 214, a suggestion component 212 determines suggested related queries for the search query 216 by employing the directed graph 210. In an embodiment, given the search query 216, a node in the directed graph corresponding with the related query 216 is identified. Related queries are then determined by examining the paths between that node and other nodes in the directed graph. In some cases, multiple connection types may exist between two nodes. For instance, two nodes may be directly linked and may also both link to a common other node. Additionally, many of the same connection-types may exist between two nodes. For instance, there might be numerous nodes that link to both nodes (i.e., numerous co-citations indicating a relationship between the two nodes).

In a simple embodiment, the number of connections between nodes is simply summed, and the nodes having the greater number of connections are determined to be more relevant. However, some connection-types may be considered more important than others. For instance, in an embodiment, direct links may be considered the most informative type of connection, and co-citation (i.e., where a third node links to both nodes) is the second most informative. Accordingly, in some embodiments, an informativeness weight is applied based on the type of link between nodes. For instance, in an embodiment, a direct link may receive the greatest weighting, a co-citation may receive the next greatest weighting, and other types of connections may receive the lowest weighting. Additionally, when multiple directed graphs are employed, different weightings may be applied to each graph. The different weights applied to different connection-types and directed graphs may be tuned manually or using machine learning techniques. For instance, feedback loops and other mechanisms may be applied to cause self-learning networks to adjust their weightings and other processing to generate more accurate and better quality related search query suggestions for search queries.

The related queries 218 determined by the suggestion component 212 are returned via the interface component 214. In embodiments, the related queries 218 are returned in conjunction with search results for the search query 216. For instance, in addition to providing the search query 214 to the suggestion component 212 for determining the related queries 218, the search query 212 may also be provided to a search engine component 220, which determines search results for the search query 216. In some embodiments, one or more of the related queries 218 (e.g., the most highly relevant related queries) may also be automatically provided to the search engine component 220 to determine search results for those related queries. The search results for those related queries may then be directly included inline with the related queries 218 in addition to the search results for the search query 216.

In embodiments, the related queries 218 may be presented in an order based on rankings determined by the suggestion component 212 or other component. The rankings may be based, for example, on the degree of relevance to the search query 216 for each of the related queries 218 based on the relationships in the directed graph 210. In some embodiments, all related queries determined to have a minimum level of relevance to the search query 216 are provided. In other embodiments, only the N most relevant related queries are provided (e.g., the five most relevant search queries). In further embodiments, if one or more related queries are determined to have a significantly higher relevance than other related queries, only those related queries with the significantly higher relevance are provided to the end user. Any and all such variations are contemplated to be within the scope of embodiments of the present invention.

The related queries 218 may be provided by the interface component 214 via a search results user interface that may include a hyperlink or other mechanism allowing for the user selection of a related query. Accordingly, when a user selects a particular related query, the interface component 214 may receive the selection and the search engine component 220 may perform a search using the selected related query. The search results for the selected related query may then be provided.

Figure 4:
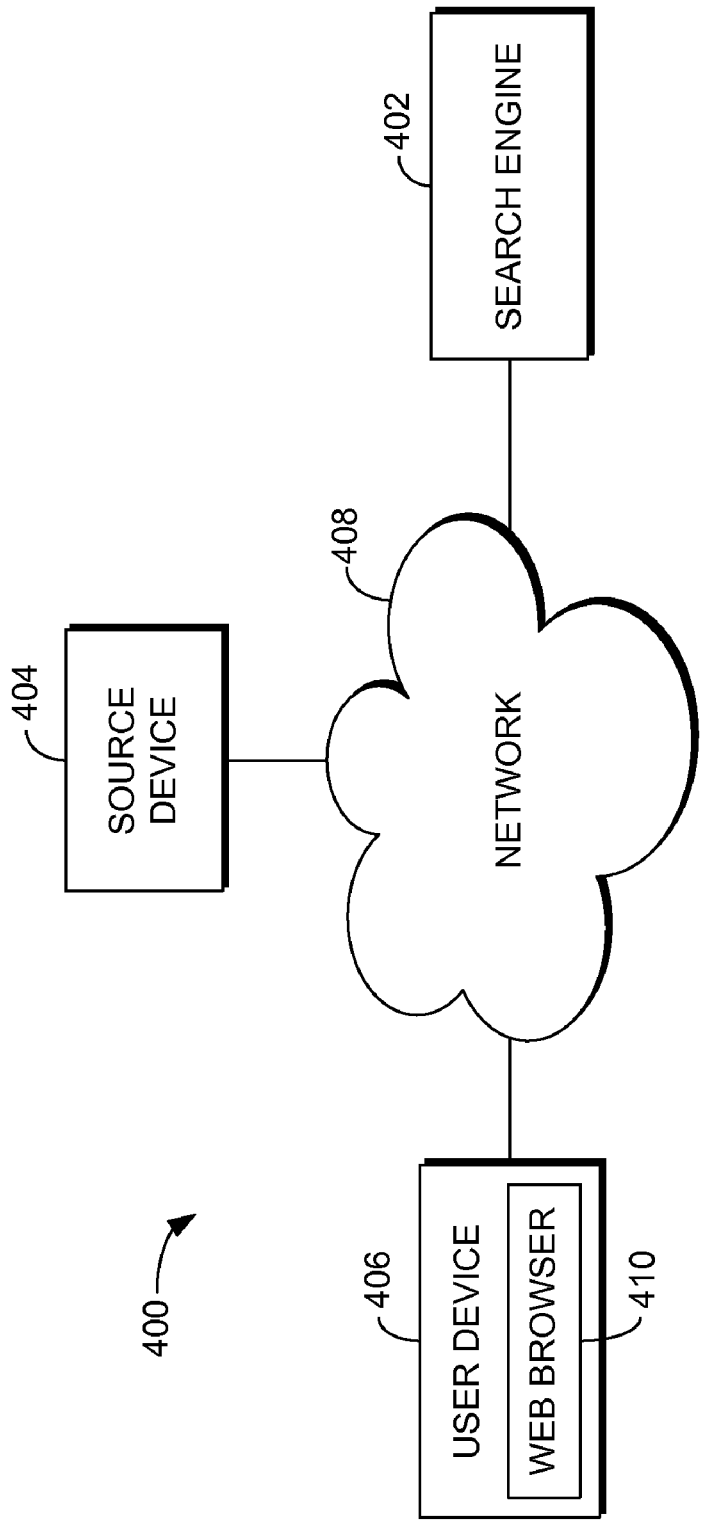
FIG. 4 is a block diagram of an exemplary system in which embodiments of the present invention may be employed.

Referring now to FIG. 4, a block diagram is provided illustrating an exemplary system 400 in which embodiments of the present invention may be employed. Among other components not shown, the system 400 may include a search engine 402, a source device 404, and a user device 406. Each of the search engine 402, source device 404, and user device 406 may be any type of computing device, such as computing device 100 described with reference to FIG. 1, for example. The components may communicate with each other via a network 408, which may include, without limitation, one or more local area networks (LANs) and/or wide area networks (WANs). Such networking environments are commonplace in offices, enterprise-wide computer networks, intranets, and the Internet. It should be understood that any number of content sharing servers, advertising servers, user devices, and networks may be employed within the system 400 within the scope of the present invention. Additionally, other components not shown may also be included within the system 400.

Source devices, such as the source device 404, may maintain a variety of web pages or other documents. For example, the source device 404 may be a web server that maintains one or more web pages. The search engine 402 may access web page and document information by communicating with or crawling these source devices. For example, the search engine 402 may periodically crawl the source device 404 to access web page and document information and/or index the information. In some embodiments, the source device 404 may serve as a trusted source of a document set. The search engine 402 or a related device may access the document set, extract titles and links, and create a directed graph similar to that discussed above with reference to the system 200 shown in FIG. 2.

By accessing and/or indexing web page and document information from various source devices, the search engine 402 may provide search capabilities to user devices, such as the user device 406. In particular, a user may employ a web browser 410 or other mechanism on the user device 406 to communicate with the search engine 402. For instance, a user may issue a search query to the search engine 402 and receive search results. As indicated previously, the search query may comprise one or more search terms, and the search engine 402 attempts to provide search results that are relevant to those search terms. In embodiments of the present invention, the search engine 402 is also configured to suggest related queries relevant to the user's search query to assist the user in refining the search and finding useful and relevant search results. In particular, a user may issue a search query via the user device 406, and the search engine 402 returns search results including one or more related queries associated with the search query. The related queries are determined based on the link structure of documents within a document set as discussed above with reference to the system 200 and FIG. 2. The related queries may be presented to the user via the user device 406 in hyperlink form, allowing user interaction with the related queries. As such, a user may select a related query, causing the search engine 402 to perform a search using the selected related query and provide search results to the user device 406.

Turning now to FIG. 5, a flow diagram is provided showing an exemplary overall method 500 for generating a directed graph for facilitating the determination of related queries for given search queries in accordance with an embodiment of the present inventions. Initially, as shown at block 502, a relevant document set is identified. In some embodiments, the document set is from a trusted data source providing a high-quality document set. For instance, the document set may be an encyclopedia or product shopping site.

Each of the documents in the document set may be used to represent a potential search query. As such, as shown at block 504, the documents are scanned, and the title of each document is extracted. The title of each document is used represents a potential query. For instance, in a case in which the document set is a collection of product reviews, each web page may be a review for a particular product such that the title of each web page corresponds with a product name. Accordingly, the product names extracted from the titles of the web pages would represent potential search queries.

As shown at block 506, links among the documents in the document set are also extracted. In particular, the content of documents within the document set are scanned to identify links. As mentioned above, in various embodiments, the links may be explicit links between documents, such as hyperlinks, and/or may be implicit linking relationships between documents, which may be inferred, for instance, based on document content similarity.

A directed graph based on the extracted document titles and links is generated, as shown at block 508. In the directed graph, the nodes are the extracted document titles, which are used to represented potential search queries, and the edges between the nodes are the extracted links. In some embodiments, a single directed graph may be generated, while in other embodiments multiple directed graphs may be generated based on different connection-types and relationships between documents in the document set. Information associated with the directed graph is stored at block 510. The information may be used to determine related queries for given search queries.

Turning now to FIG. 6, a flow diagram is provided illustrating an exemplary method 600 for suggesting related queries for a given search query using the linking structure of a document set in accordance with an embodiment of the present invention. Initially, as shown at block 602, a search query is received. As one skilled in the art will recognize, the search query may comprise one or more search terms entered by an end user. Additionally, the search query may be received at the search engine in a number of different ways. By way of example only and not limitation, a user may employ a web browser to navigate to a search engine web page and enter the search query in an input box on the web page. Additionally, a user may enter the search query in an input box provided by a search engine toolbar located, for instance, within a web browser, the desktop of the user's computing device, or other location. One skilled in the art will recognize that a variety of other approaches may also be employed to allow an end user to provide a search query to a search engine.

After receiving the search query, related queries relevant to the search query are determined based on the linking structure of a document set, as shown at block 604. In an embodiment, information associated with a directed graph, such as that generated in accordance with the method 500 of FIG. 5, may be used to determine related queries. In particular, a node in the directed graph is identified as corresponding with the received search query. Related queries relevant to the search query are then determined by examining the links between the node corresponding with the search query and surrounding nodes in the directed graph. The connections between the nodes are used to determine the related queries having the most relevance for the search query. In some embodiments, weighting may be applied based on the type of connections between nodes.

As shown at block 606, after determining related queries for the search query, at least a portion of the related queries are communicated for presentation to the end user. The related queries may be ordered based on relevance to the search query as determined by connections in the directed graph. In some embodiments, the related queries are returned with a set of search results for the search query. In some embodiments, search results for one or more the related queries are also automatically returned. In further embodiments, each related query may be provided using a hyperlink or other mechanism allowing for the user selection of a related query. Accordingly, when a user selects a particular related query, a search is performed using the selected related query, and the search results for the related query may then be provided to the end user.

Figure 7:
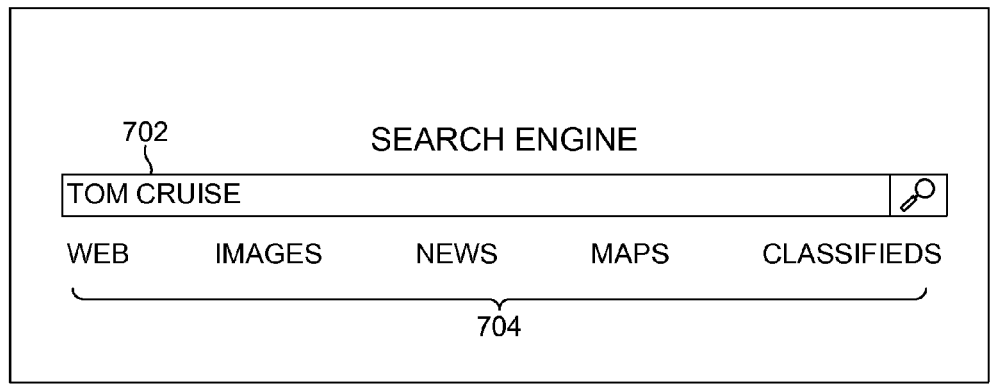
FIG. 7 is an illustrative screen display showing a search input box for a search engine in accordance with an embodiment of the present invention.

By way of illustration, FIG. 7 illustrates a search input box 702 that may be provided, for instance, via a search engine web page. The search input box 702 allows a user to enter a search query for search purposes. As known in the art and shown in FIG. 7, a search engine may provide a variety of searching capabilities, including a broad web search and a variety of vertical searches. Accordingly, a number of search selections 704 are provided in conjunction with the search input box 702. By inputting a search query in the search input box 702 and selecting one of the search selections 704, a user may cause the search engine to perform the selected type of search using the inputted search query.

Figure 8:
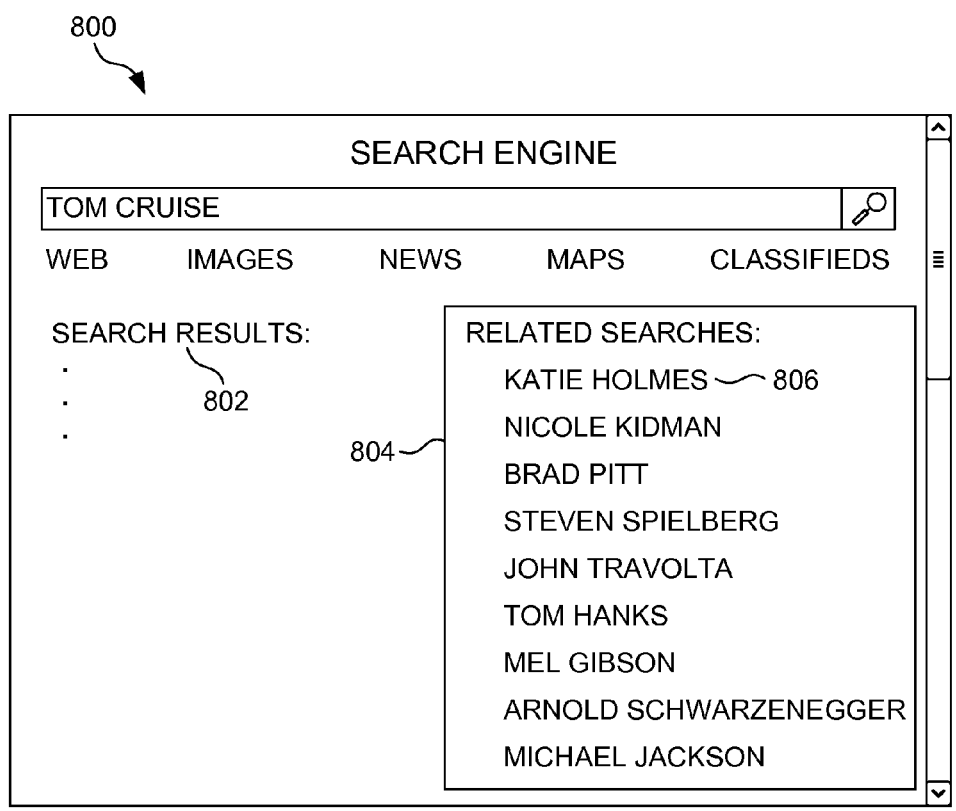
FIG. 8 is an illustrative screen display showing a search results user interface including suggested related queries for a given search query in accordance with an embodiment of the present invention.

In the illustrated example, the user has entered the search query {Tom Cruise} in the search input box 702. After entering the search query, the search engine performs a search using the search query. Additionally, the search engine determines that a number of related queries are relevant to the search query. Accordingly, the search engine provides a search results user interface 800 shown in FIG. 8. The search results user interface 800 includes a list of search results 802. Additionally, the search results user interface 800 includes a list of suggested related queries 804 determined to be relevant for the search query. As indicated previously, each related query may be presented in hyperlink form allowing the user to interact with the related queries, for instance, by selecting a particular related query and causing a search to be performed using the selected related query. For instance, a user may choose to select the related query {Katie Holmes} 806 to cause a search to be performed using that search query and search results to be returned. Related queries for the query {Katie Holmes} may also be determined and returned with the search results.

As can be understood, embodiments of the present invention provide related queries for a given search query using the linking structure of documents within a document set. The related queries may be used to refine a user's search and facilitate returning relevant and useful search results.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method for providing related queries for a search query, the method comprising:
   receiving the search query;
   determining one or more related queries for the search query based on the linking structure of electronic documents within a document set, wherein titles of the electronic documents are identified as potential related queries from which the one or more related queries are determined, the linking structure of electronic documents within the document set includes explicit links between electronic documents, wherein the explicit links comprise hyperlinks in text of electronic documents linking to other electronic documents within the document set; and communicating at least a portion of the one or more related queries for presentation to an end user.

2. The method of claim 1, wherein the electronic documents comprise a high-quality document set from a trusted data source.

3. The method of claim 1, wherein the linking structure of electronic documents within the document set includes implicit links between electronic documents inferred based on document content.

4. The method of claim 1, wherein determining one or more related queries comprises analyzing a directed graph generated based on the linking structure between the electronic documents, wherein the titles of the electronic documents are nodes and links between the documents are edges between the nodes.

5. The method of claim 4, wherein analyzing the directed graph comprises identifying a first node as corresponding with the search query and determining the one or more related queries by identifying one or more other nodes having a relationship with the first node.

6. The method of claim 1, wherein communicating at least a portion of the one or more related queries comprises communicating the at least a portion of the one or more related queries with a first set of search results associated with the search query, and wherein the method further comprises:

receiving a user selection of a related query from the one or more related queries;

performing a search using the related query to obtain a second set of search results associated with the related query; and communicating at least a portion of the second set of search results for presentation to the end user.

7. The method of claim 1, wherein the linking structure of electronic documents within the document set includes links of different connection-types and wherein the one or more related queries are ranked by applying weightings to the different connection-types.

8. The method of claim 7, wherein the connection-types include direct links and indirect links.

9. One or more computer-readable media storing computer-useable instructions that, when used by a computing device, cause the computing device to perform a method for providing related queries for a search query, the method comprising:

receiving the search query;

determining one or more related queries for the search query based on the linking structure of electronic documents within a document set, wherein titles of the electronic documents are identified as potential related queries, the linking structure of electronic documents within the document set includes explicit links between electronic documents, wherein the explicit links comprise hyperlinks in text of electronic documents linking to other electronic documents within the document set; and communicating at least a portion of the one or more related queries for presentation to an end user.

10. The one or more computer-readable media of claim 9, wherein the linking structure of electronic documents within the document set includes implicit links between electronic documents inferred based on document content.

11. The one or more computer-readable media of claim 9, wherein determining one or more related queries comprises analyzing a directed graph generated based on the linking structure between the electronic documents, wherein the titles of the electronic documents are nodes and links between the documents are edges between the nodes.

12. The one or more computer-readable media of claim 11, wherein analyzing the directed graph comprises identifying a first node as corresponding with the search query and determining the one or more related queries by identifying one or more other nodes having a relationship with the first node.

13. The one or more computer-readable media of claim 9, wherein the linking structure of electronic documents within the document set includes links of different connection-types and wherein the one or more related queries are ranked by applying weightings to the different connection-types.

14. One or more computer-readable media storing computer-useable instructions that, when used by a computing device, cause the computing device to perform a method for providing related queries for a search query, the method comprising:

receiving the search query;

identifying the search query as corresponding with a title of a first electronic document within a document set having a plurality of electronic documents;

determining related queries based on titles of other electronic documents within the electronic document set having a relationship with the first electronic document based on links among the plurality of electronic documents, the links among the plurality of electronic documents include explicit links between electronic documents, wherein the explicit links comprise hyperlinks in text of electronic documents linking to other electronic documents within the document set; and communicating at least a portion of the related queries for presentation to an end user.

15. The one or more computer-readable media of claim 14, wherein the electronic documents comprise a high-quality document set from a trusted data source.

16. The one or more computer-readable media of claim 14, wherein the links among the plurality of electronic documents include implicit links between electronic documents inferred based on document content.

17. The one or more computer-readable media of claim 14, wherein the links among the plurality of electronic documents include links of different connection-types and wherein the one or more related queries are ranked by applying weightings to the different connection-types.

* * * * *